INVENTOR
WALTER HERTERICH
by Walter S. Bleston
ATTORNEY

May 19, 1964 W. HERTERICH 3,133,710

MAGNETIC RECORDER

Filed June 13, 1961 7 Sheets-Sheet 2

INVENTOR

WALTER HERTERICH by Walter S. Oleston

ATTORNEY

May 19, 1964 W. HERTERICH 3,133,710

MAGNETIC RECORDER

Filed June 13, 1961 7 Sheets-Sheet 3

INVENTOR

WALTER HERTERICH by Walter S. Oleston

ATTORNEY

INVENTOR
WALTER HERTERICH
by Walter S. Bleston
ATTORNEY

INVENTOR
WALTER HERTERICH
by Walter S. Bleston
ATTORNEY

May 19, 1964

W. HERTERICH

MAGNETIC RECORDER 3,133,710

Filed June 13, 1961

7 Sheets-Sheet 6

INVENTOR
WALTER HERTERICH
by Walter S. Bleston
ATTORNEY

May 19, 1964 W. HERTERICH 3,133,710

MAGNETIC RECORDER

Filed June 13, 1961 7 Sheets-Sheet 7

INVENTOR
WALTER HERTERICH
by Walter S. Bleston
ATTORNEY 3,133,710

MAGNETIC RECORDER

Walter Herterich, 7 L. v. Herterichstrasse, Dachau, Germany

Filed June 13, 1961, Ser. No. 116,790
14 Claims. (Cl. 242—55.12)

Driving devices for magnetic tape or wire recorders are known wherein the recording medium (i.e. tape or wire) is movable in both directions between reels past a pick-up head at normal speed, to obviate the need for taking the reels out of the recorder so as to reverse the recording medium for playing a second track thereof. Such a device is usually driven by a friction wheel which is driven frictionally by a friction roller and which engages with, and therefore drives, one or the other of the two reels in dependence upon the desired direction of rotation. The direction in which the motor or friction roller rotates automatically determines the side on which the friction wheel engages with the reel—i.e., it automatically determines the direction of tape motion .

In these driving devices, the friction wheel is carried by a lever which is pivotable to move the friction wheel into one of two alternative operative positions depending upon the direction of motor rotation. In one such operative position one side of the friction wheel contacts one reel whilst in the other position the other side of the friction wheel contacts the other reel. Automatic change-over between such positions is provided by a friction coupling on the friction wheel, such friction coupling operating upon the aforesaid pivoting lever. In the known constructions the pivot of the lever is disposed between the friction wheel and the friction roller. These arrangements have the disadvantage that the friction coupling must transmit fairly great forces to move the friction wheel between its two operative positions and also to apply the friction wheel to the engaged tape reel with sufficient pressure. This question is of no importance in ordinary magnetic recorders, but it is an object of this invention to provide a driving system which will operate very reliably and efficiently in small pocket recorders running off a very small battery.

To this end, according to the invention the pivot of the rocking lever which bears the friction wheel is disposed near or at the center of the friction roller and in any case on the same side of the friction wheel. This ensures that the spring which urges the friction wheel into engagement with the friction roller always remains in the same position and therefore, in contrast to the known arrangements, does not require any energy from the friction coupling. Just as in the known constructions, the friction wheel is carried by a lever or slide and has a friction coupling but the latter, instead of acting on such lever or slide, acts upon an auxiliary lever which extends through a slot to co-operate with a stationary guide pin. Since the distance to be covered by the friction roller or first lever between the two operative positions can be relatively small, the second or auxiliary lever can be very short. The shorter the lever can be in the construction according to the invention, the smaller is the torque which must be transmitted by the friction coupling to ensure reliable movement and reliable bearing engagement. The complete construction according to the invention has yet another advantage—unavoidable irregularities introduced by the friction arrangement into the constant running, and therefore the quality of reproduction of the recorder, are diminished as compared with prior known arrangements as the friction roller torque which the friction coupling must transmit to move the lever is less than the torque required to progress the recording tape or wire.

Of course, a fast rewind speed for the recording medium can be provided in the drive according to the invention. A number of embodiments are mentioned hereinafter in the description relating to the accompanying drawings, most of such embodiments being based on the principle that the spindle carrying the friction roller is provided with an extra or second friction wheel which can be moved selectively into driving engagement with the flanges of the one or the other of the two reels by the spindle being moved laterally. Since the diameter of the second friction wheel is much larger than the diameter of the friction roller, a greater step-up is provided—i.e., a fast rewind for the recording medium is provided. One constructionally advantageous method of providing fast rewind is by use of a two-part angled friction wheel transmission, the friction roller being disposed on the shaft thereof, while the motor which is perpendicular thereto is adapted to provide normal speed or a fast rewind by the motor spindle, which engages in such transmission, being raised or lowered to cooperate with one or other part of such friction wheel. Of course, the raising and lowering of the motor means that extra space is required and also, for instance, that the height of the complete device must be increased; also, a mounting of the kind permitting the motor to be pivoted or raised and lowered must be provided. Alternatively, therefore, the friction roller spindle can be arranged to be raised or lowered, so that the associated two-part friction wheel transmission co-operates with the stationary motor, or its shaft, in just the same way as hereinbefore described.

A disadvantage of this arrangement, however, is that the friction roller, friction wheel and reel flange must be shifted axially, and the extra friction losses produced and the uneven pressure relationships cause transverse friction which may damage the friction wheel surfaces and therefore impair the reliability of the device as a whole. One method of obviating this disadvantage would be to provide an additional device which acts to disengage the friction members from one another when a change-over is made from the ordinary speed to the fast return speed. A mechanically satisfactory and simple solution which obviates most of these difficulties is to use a wholly pivotable component on which the friction roller, two-part friction wheel transmission and the friction wheel are mounted. The pivot of the pivoting component is so chosen as to obviate vertical movement between the friction wheel and the tape reel. Raising and lowering can be performed by a mechanical pressing device, for instance, by press-buttons.

As a variant of the construction according to the invention just described there can be used another novel arrangement in which the motor spindle extends in the same direction as—i.e., parallel with—the roller spindle. In this case a friction transmission provided in the actual friction wheel is used, and a friction roller disposed on the motor spindle engages, for normal speed, with the inside of an outer flange of the friction wheel and, for fast return speed, with an inner central part of the friction wheel, it being immaterial whether the motor or the friction wheel is moved to obtain these two relative positions.

The invention will be described further, by way of example, with reference to the accompanying drawings wherein.

Figures 1, 2, 3:
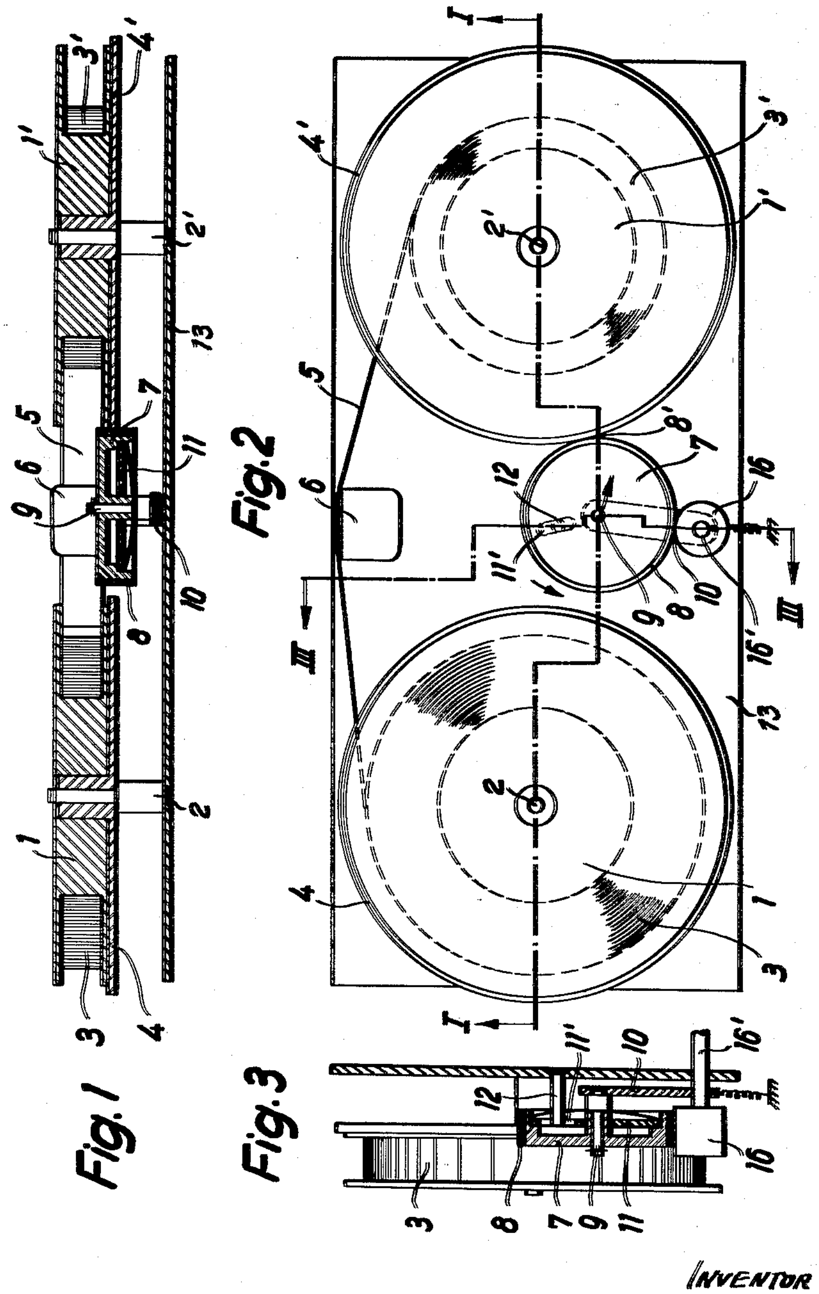
FIGURE 1 is a vertical longitudinal section, showing a first embodiment, the section being taken along the line I—I of FIGURE 2.
FIGURE 2 is a plan view of the embodiment of FIGURE 1.
FIGURE 3 is a vertical cross-section, taken along the line III—III of FIGURE 2.

Referring to FIGURE 1, coils 3, 3′ of magnetic recording tape 5 are disposed on reels 1, 1′. The tape 5 moves from the reel 1 to the reel 1′, passing by a pickup head 6. The reels 1, 1′ are mounted for rotation on respective spindles 2, 2′. The tape 5 is driven by way of a part 3′ of flange 4′ of the reel onto which the tape 5 is being wound. Engaging with the part 3′ is a friction wheel 7 having a rubber covering 8. The friction wheel 7 is disposed upon a spindle 9 carried by a supporting lever 10 mounted for rotation around a drive spindle 16′ radially spaced from the spindle 9, and can therefore readily be pivoted into driving engagement with the flanges of either reel 1 or 1′. The friction wheel 7 is driven frictionally by a friction roller 16 disposed on the spindle 16′. To urge the friction wheel 7 against the reel flange 4′ with appropriate force, a brake disc 11 is provided. This disc 11 acts as a lever and is rotatably mounted on the friction wheel spindle 9, being either coupled by a friction coupling with the friction wheel 7 or rubbing against the underside of a circumferential portion thereof. The disc 11 is formed with an eccentric radially elongated slot 11′ engaged by a stop pin 12 secured to the baseplate 13 of the recorder. When the friction wheel 7 rotates in the direction indicated by the arrow in FIG. 2, the disc 11 tends to rotate in the same direction but is prevented from so doing by the stop pin 12, so that the spindle 9 moves in the direction indicated in FIG. 2 (i.e. to the right in FIGURES 1 and 2) and engages the friction wheel 7 with the reel flange 4′.

To alter the direction of tape motion as required when a different track is to be recorded or reproduced, all that is necessary is to reverse the direction of rotation of the motor which drives the spindle 16′ or of the friction roller 16. The spindle 9 then shifts to the left, in the direction opposite to the direction indicated by the relative arrow in FIGURE 2, until the friction wheel 7 engages with reel flange 4 of the reel 1 which, accordingly becomes the winding-on reel, with the result that the tape 5 now unwinds from the reel 1′ as it is progressed past the pickup head 6. The direction of tape movement can, therefore, be altered just by altering the direction of rotation of the friction roller 16.

As an alternative to the form shown in FIGURES 1 to 3, the pin 12 can be disposed in the disc 11 and engage in a slot in the baseplate. The advantage of the embodiment described with reference to the drawings is that there is no chance of the disc 11 tilting, so that the possibility of uneven frictional engagement between the disc 11 and the friction wheel 7 is minimized. Also, the arrangement shown in FIGURES 1 to 3 has a very good effect on the synchronization of the device.

Figure 5:
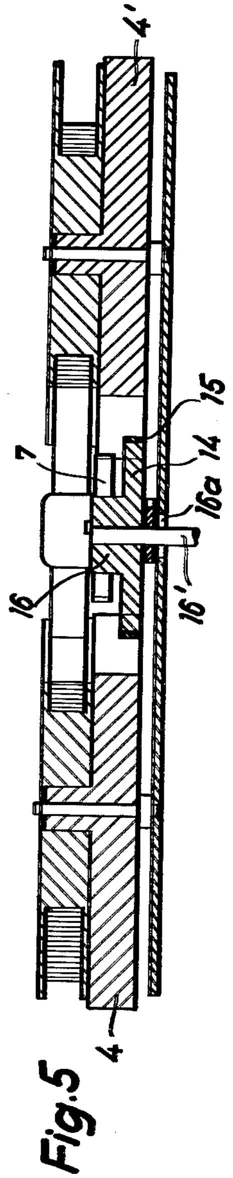
FIGURE 5 is a sectional view taken along the line V—V of FIGURE 4.
Figure 4:
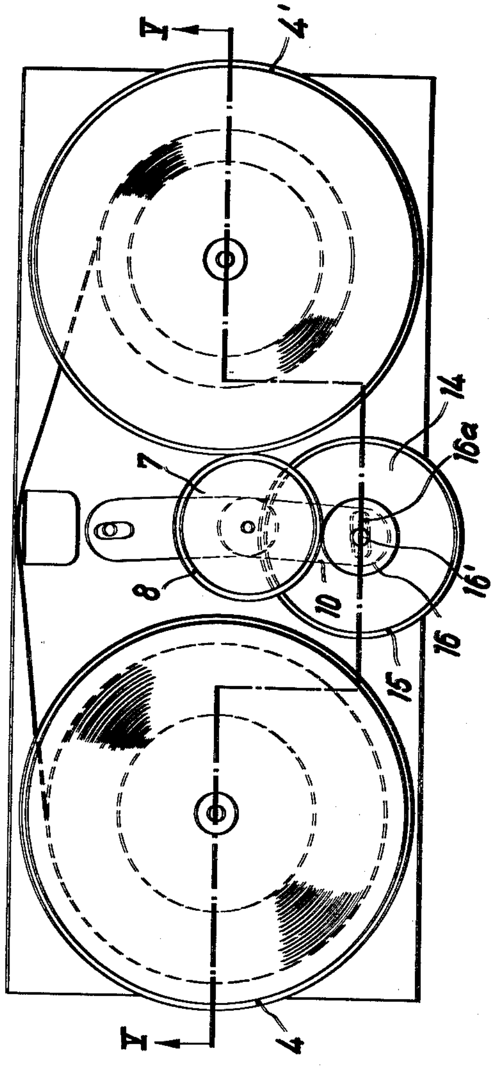
FIGURE 4 is a plan view of a second embodiment, this having a fast rewind arrangement.

The embodiment shown in FIGURES 4 and 5 comprises a fast rewind arrangement. In this arrangement a second friction wheel 14 having a rubber covering 15 is disposed below the friction roller 16. The drive spindle 16′ can be shifted a little in an aperture 16*a* so that the rubber covering 15 can be selectively engaged with either reel flange 4 or 4′ and drive the same frictionally. The lever 10 is simultaneously shifted a little so that the friction roller 16 does not remain in engagement with the friction wheel 7 or its rubber covering 8. Since the diameter of the second or auxiliary friction wheel 14 is great in relation to the diameter of the friction roller 16, the tape 5 is rewound much faster than its normal forward speed. The second friction wheel 14 must, of course, be large enough almost to engage with the flange 4 or 4′ of the winding-on reel 1 or 1′ when the friction wheel 7 is in engagement with such flange.

Figure 6:
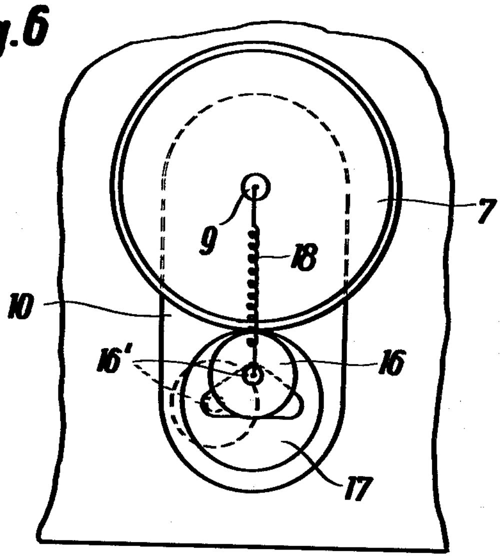
FIGURES 6 and 7 are fragmentary plan views showing two different control arrangements providing for fast rewind, for two-track operation.
Figure 7:
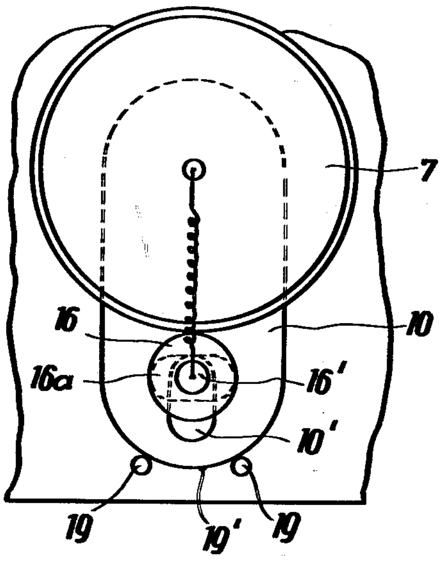

FIGURES 6 and 7 illustrate two different guide devices for shifting the arm 10 in the manner necessary for providing fast rewinding. However, the device, having as it does two fast positions for the two directions of tape movement, is of use only for two-track operation. The tape reels are not shown in FIGURES 6 and 7 and are disposed below or above the plane of the drawings.

The lever 10 bearing the spindle 9 of the friction wheel 7 is, in the device shown in FIGURE 6, mounted on a pin 17 formed with a triangular guide recess. Movingly mounted therein is the spindle 16′, on which the friction roller 16 and the friction wheel 14 (not shown in FIGURES 6 and 7) are mounted, such spindle 16′ being urged towards the central or normal position defined by the apex or corner of the triangle nearest the spindle 9 by a spring 8. The friction wheel 7 is, therefore, engaged by the friction roller 16. When the spindle 16′ is moved along the wall of the recess adjacent the corner, for instance, to the left, into the position shown in chain lines, the distance between the spindle 16′ and the spindle 9 is increased, so that the friction wheel 7 disengages from the roller 16. This lateral movement brings the second friction wheel 14 into engagement with the reel flange 4 (FIG. 4).

In the arrangement shown in FIGURE 7, the spindle 16′ can be moved laterally in slot 16*a*. When the spindle 16′ is moved laterally, the bottom rounded end 19′ of the lever 10 abuts one of a number of stationary abutments 19 and thus lifts up the lever 10 in the slot 10′, with the result that the friction wheel 7 is displaced away from and disengaged from the friction roller 16. Conveniently, the spindle 16′ is moved laterally by a lever (not shown) which simultaneously reverses the motor, by means of a reversing switch, and moves the pickup head 6 into operative association with the corresponding track of the tape. Conveniently, the last-mentioned lever, which is used for track shifting and to initiate fast rewind, has four positions corresponding to; rapid rewind, track 1; normal forward speed, track 1; normal forward, speed track 2; and rapid rewind, track 2. Movement of the pickup head vertically into operative association with the appropriate track of the tape is effected by reversal of the lever which serves to move the spindle, whilst such spindle is in its central position. Motor reversal is then also effected. When the lever is in either of the two outer positions, the spindle 16′ is moved laterally, but there is no change in head height and motor direction.

The operation of the lever is such that the tape 5 is always progressed and rewound in the correct direction even at the fast speeds. The lever can readily be given a fifth and central position in which the recorder is switched off.

Reliable operation is very difficult in the case of multiple-track operation (two or more tracks), for if the position of the friction wheel 7 is wrong, the tape 5 unwinds from one reel without being wound onto the other. According to the invention, therefore, motion to either hand in dependence upon the direction of motor rotation is achieved by simple mechanical elements. There are two main ways of achieving this and they are shown in FIGURES 8 and 9.

Figure 8:
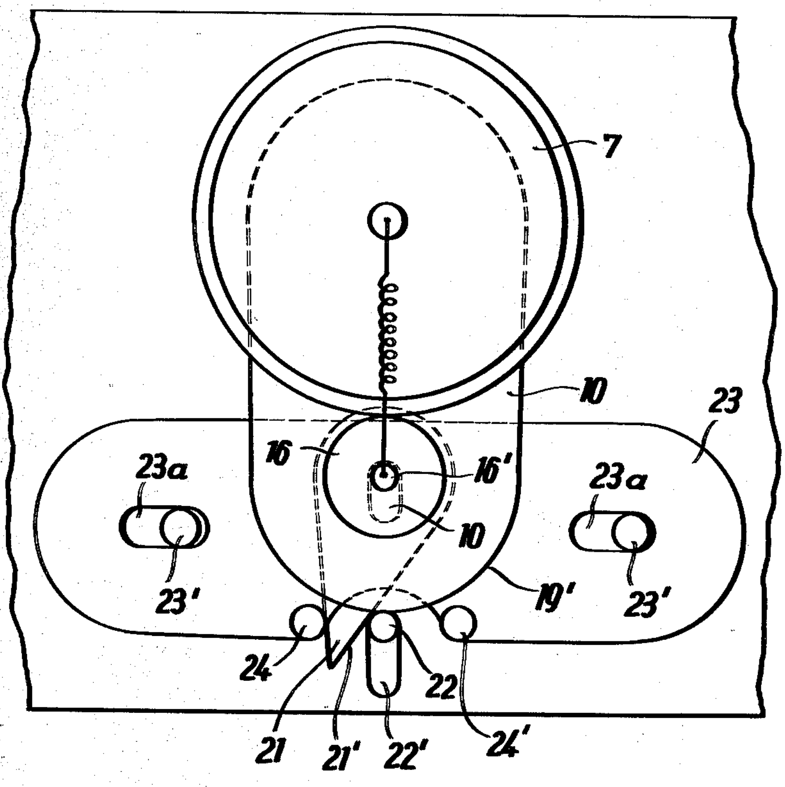
FIGURES 8 and 9 are plan views showing two other control devices for multiple-track systems.

In the embodiment shown in FIGURE 8, a locking bolt or wedge 21 is provided on the spindle 16′. The bolt 21 is mounted in a plate 23 formed, in order that it may be displaceably mounted on the baseplate, with slots 23a engageable by pins 23' secured to the baseplate of the recorder. The locking bolt 21 moves with the spindle 16' and, depending upon the direction of motor rotation, bears either against a stop pin 24 (see FIG. 8) disposed on the plate 23 or against a stop pin 24'. For fast speeds, a pin 22 in the slot 22' of the baseplate is moved in an upward direction as viewed in FIG. 8. This pin 22 engages as it is moved, with edge 21' of the locking bolt 21 and presses the latter and the plate 23 to the left so that the spindle 16' is also moved to the left. When there is a change in the direction of rotation, the locking bolt 21 pivots to the right and the pin 22 when moved upward, engages with the opposite edge of the bolt 21, with the result that the plate 23, with the spindle 16' is shifted to the right. The pin 22, when in its top position, presses upon the rounded bottom end 19' of the lever 10 and so raises the same (the slot 10' permitting this) that the friction wheel 7 is disengaged from the friction roller 14.

Figure 9:
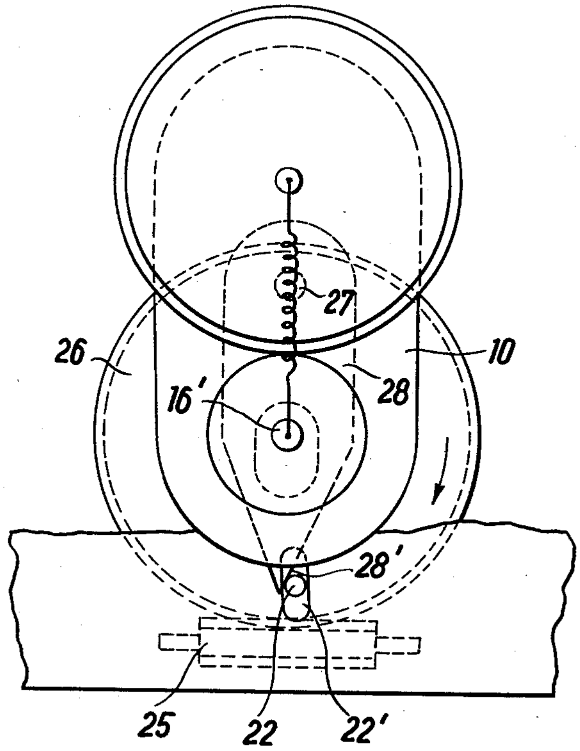

Another control arrangement of the same kind is shown in FIGURE 9 but this requires the use of a worm drive. In the device shown in FIGURE 9, the spindle 16' is mounted, for lateral movement, in a bush disposed on a lever 28 rotatably mounted on a stationary spindle 27. A worm wheel 26, driven by a worm 25, is disposed on the spindle 16'. If drive is effected so that, for instance, the worm wheel 26 rotates clockwise, the bottom end of the lever 28, together with the spindle 16', is moved to the left (since the spindle 16' always offers some resistance to rotation and such resistance can be caused, for instance, just by the frictional engagement between the disc 11 and the friction wheel 7) until the friction wheel 14 barely engages the flange 4 of the left-hand reel 1. Since such pressure is insufficient to rotate the flange 4 through the friction wheel 14, the lever 28 has a tapered projection. When the control pin 22 rises in the slot 22', the pin 22 abuts against the flank 28' of the projection of the lever 28 and moves the bottom end thereof further to the left, so that the required pressure is provided. The pin 22 also moves the lever 10 in an upward direction as viewed in FIG. 9, so that the friction wheel 7 and friction roller 16 do not engage with one another.

Obviously, for rapid rewinding, the spindle 16 can remain stationary instead of being moved and one or both of the spindles 2 and 2' can be moved.

Figure 10:
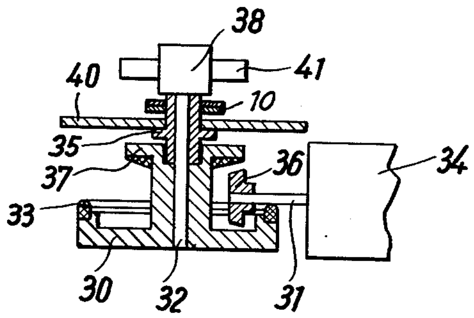
FIGURE 10 is a detached enlarged sectional side elevational view showing a double friction wheel transmission incorporated in certain embodiments of the invention.

FIGURE 10 is a side-elevational sectional view of a transmission including a double rimmed friction-wheel 30, the spindle 31 of a motor 34 being disposed perpendicularly to a friction roller spindle 32 fixed to the wheel 30. For normal speed, which is the case shown in FIGURE 10, the motor spindle 31 is in engagement with a rubber covering 33 on the wheel 30, the covering being annular and of relatively large diameter. When the mounting 35 of the spindle 32 is lowered, a friction wheel 36 on the spindle 31 engages a relatively small friction rim 37 on the wheel 30. Consequently, although the motor speed remains the same, the direction of rotation of the friction roller 38 mounted on the spindle 31 is reversed and the speed of the cooperating friction wheel 41 is increased. In the first case, the recorder runs at normal speed and in the second case the fast rewind speed is obtained.

Figure 11:
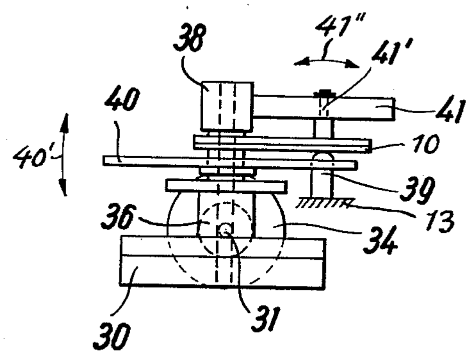
FIGURE 11 shows the apparatus of FIGURE 10 in sectional front elevation.

Referring to FIGURE 11, which shows the apparatus of FIG. 10 in front-elevational section, friction roller 38 and the cooperating friction wheel 41 are disposed on a carrier member 40 pivotally mounted on a pin 39 for movement in a vertical plane as indicated by the arrow 40'. The transmission including the friction-wheel 30 is axially secured to the member 40. The lever 10 is pivoted on the spindle 32 and carries the shaft 41' of the friction wheel 41 which is closely adjacent the pivot on the pin 39. The movement of the shaft 41' of the friction wheel 41 is substantially rectilinear in the direction of the arrow 41'' when the member 40 pivots between the two positions in which the wheel 36 and the spindle 31 respectively engage the rubber covering 33 and the rim 37.

Figure 12:
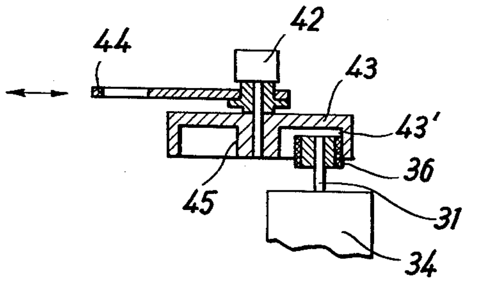
FIGURES 12 and 13 show, as another detail, in section and in plan view respectively, a planetary friction wheel transmission wherein the motor spindle extends parallel with the friction roller spindle.
Figure 13:
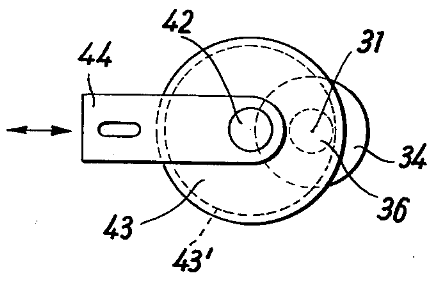

FIGURE 12 is a sectional view and FIGURE 13 is a plan view of an arrangement constituting a planetary friction wheel transmission, the spindle 31 of the motor 34 being disposed parallel with the friction wheel spindle 42, while the friction wheel 36 engages with the inside of a circumferential flange 43' of an intermediate friction wheel 43 for normal speed. For rapid rewind, the member 44, in which the spindle 42 is journaled, is shifted to the right in FIGURE 12 so that the friction wheel 36 engages the hub 45 of the wheel 43. In the former case, the friction wheel operates at normal speed, while in the latter case the direction of rotation and the transmission ratio are altered to give the fast rewind speed.

I claim:

1. A driving arrangement for a magnetic recording device and the like comprising in combination:
   (*a*) base plate means;
   (*b*) two reel means rotatably mounted on said base plate means;
   (*c*) a supporting member movable on said base plate means between two positions;
   (*d*) friction wheel means rotatable about an axis on said supporting member, said friction wheel means selectively engaging respective ones of reel means in driving engagement when said supporting member is in said positions thereof;
   (*e*) brake means rotatable on said supporting member about said axis and frictionally engaging said wheel means;
   (*f*) cooperating stop means on said base plate means and on said brake means for limiting rotation of said brake means about said axis; and
   (*g*) drive means for actuating rotation of said friction wheel means about said axis.

2. A driving arrangement as set forth in claim 1, wherein said stop means include a pin member having an axis spaced from the common axis of rotation of said friction wheel and of said brake means, said brake means being rotatable about the axis of said pin member.

3. A driving arrangement as set forth in claim 1, wherein said stop means include two elements, one each on said base plate means and on said brake means respectively, one of said elements being a pin member, and the other element defining a slot movably receiving said pin member.

4. A driving arrangement as set forth in claim 3, wherein said pin member is movable in said slot in a direction radial with respect to the common axis of rotation of said friction wheel means and of said brake means, and said supporting member is pivotable between said two positions thereof about an axis radially spaced from said common axis.

5. A driving arrangement as set forth in claim 1, wherein said brake means include a disc member engaging a circumferential portion of said friction wheel means.

6. A driving arrangement as set forth in claim 1, wherein said drive means includes a drive spindle, friction roller means on said spindle and normally engaging said friction wheel means, an auxiliary friction wheel on said drive spindle, and spindle shifting means operatively connected to said drive spindle for engaging said auxiliary friction wheel with one of said reel means while simultaneously disengaging said friction roller means from said friction wheel means.

7. A driving arrangement as set forth in claim 6, wherein said spindle shifting means includes wedge means for urging said auxiliary friction wheel toward said one reel means when said friction roller means is disengaged from said friction wheel means.

8. A driving arrangement as set forth in claim 1, wherein said drive means includes a motor, and transmission means interposed between said motor and said friction wheel means for alternatingly rotating said friction wheel means in one direction at a first speed and in the other direction at a second speed greater than said first speed while said motor rotates in one direction at a fixed speed.

9. A driving arrangement as set forth in claim 6, wherein said drive spindle has an axis of rotation, and said spindle shifting means include guide means for guiding movement of said drive spindle between a normal position in which said friction roller means engages said friction wheel means, into another position spaced from said normal position transversely of said drive spindle axis, said friction roller means being spaced from said friction wheel means and said auxiliary friction wheel engaging one of said reel means when said drive spindle is in said other position, and yieldable resilient means for urging said drive spindle into said normal position thereof.

10. A driving arrangement as set forth in claim 9, wherein said guide means includes a guide member mounted on said base plate means and formed with an opening therein, said drive spindle passing through said opening, and said guide member having a wall in said opening, said wall defining a corner near said friction wheel means, said corner receiving said drive spindle in said normal position thereof, and a guide face in said opening contiguously adjacent said corner and extending therefrom in a direction away from said friction wheel means.

11. A driving arrangement as set forth in claim 9, wherein said spindle shifting means further include motion transmitting means interposed between said spindle and said friction wheel means, and responsive to movement of said drive spindle from said normal position to said other position thereof for moving said friction wheel means in a direction away from said friction roller means.

12. A driving arrangement as set forth in claim 6, wherein said drive means further include worm wheel means coaxially mounted on said drive spindle, and worm means in driving engagement with said worm wheel means, said worm wheel means being rotatable about an axis extending in the direction of movement of said supporting member between the two positions thereof, and said drive spindle being movable a predetermined distance in said direction responsive to rotation of said worm wheel means, and said spindle shifting means include an abutment member on said drive spindle, and control pin means movable on said base plate means into engagement with said abutment member when said spindle has been moved said predetermined distance for further moving said spindle in said direction, and for engagement with said supporting member for moving said friction wheel means away from said friction roller means.

13. A driving arrangement as set forth in claim 8, wherein said transmission means include a transmission wheel having two coaxial rim portions of different diameter, a rotatable member operatively connected to said motor for joint rotation, said transmission wheel being axially movable between respective positions of driving engagement of said rim portions thereof with said rotatable member, and rotary motion transmitting means interposed between said transmission wheel and said friction wheel means.

14. A drive arrangement as set forth in claim 13, further comprising pivot means on said base plate means; a carrier member mounted on said pivot means, said supporting member and said transmission wheel being mounted on said carrier member, and said rotary motion transmitting means including friction roller means coaxially fastened to said transmission wheel and engaging said friction wheel, said carrier member being pivotable on said pivot means between said respective positions of driving engagement of said rim portions, said friction wheel means being substantially nearer said pivot means than said rotatable member.

References Cited in the file of this patent

UNITED STATES PATENTS

| | | |
|---|---|---|
| 2,611,284 | Albee | Sept. 23, 1952 |
| 2,675,973 | Reed et al. | Apr. 20, 1954 |
| 3,009,663 | Armstead | Nov. 21, 1961 |